United States Patent
Lin et al.

(10) Patent No.: US 12,099,410 B2
(45) Date of Patent: Sep. 24, 2024

(54) STATISTICS TABLE OF SOLID STATE STORAGE DEVICE AND USING METHOD THEREOF

(71) Applicant: SOLID STATE STORAGE TECHNOLOGY CORPORATION, Taipei (TW)

(72) Inventors: Liang-You Lin, Taipei (TW); Ya-Ping Pan, Taipei (TW); Po-Lin Liu, Taipei (TW); Chang-Chun Zheng, Taipei (TW)

(73) Assignee: SOLID STATE STORAGE TECHNOLOGY CORPORATION, Taipei (TW)

( * ) Notice: Subject to any disclaimer, the term of this patent is extended or adjusted under 35 U.S.C. 154(b) by 38 days.

(21) Appl. No.: 18/144,995

(22) Filed: May 9, 2023

(65) Prior Publication Data
US 2024/0184671 A1 Jun. 6, 2024

(30) Foreign Application Priority Data

Dec. 1, 2022 (CN) .......................... 202211536224.5
Mar. 14, 2023 (CN) .......................... 202310244017.0

(51) Int. Cl.
*G06F 11/10* (2006.01)
*G06F 11/30* (2006.01)

(52) U.S. Cl.
CPC ...... *G06F 11/1068* (2013.01); *G06F 11/3034* (2013.01); *G06F 11/3058* (2013.01)

(58) Field of Classification Search
CPC ............ G06F 11/1068; G06F 11/3034; G06F 11/3058
See application file for complete search history.

(56) References Cited

U.S. PATENT DOCUMENTS

| | | | | |
|---|---|---|---|---|
| 9,189,309 | B1 * | 11/2015 | Ma .................... | G06F 11/008 |
| 9,490,024 | B1 * | 11/2016 | Zeng .................. | G11C 29/028 |
| 11,314,635 | B1 * | 4/2022 | Volpe ................ | G06F 11/1004 |
| 2009/0182936 | A1 * | 7/2009 | Lee .................... | G06F 12/0246 |
| | | | | 711/E12.001 |
| 2010/0100763 | A1 * | 4/2010 | Chen .................. | G06F 11/1068 |
| | | | | 711/E12.008 |
| 2011/0302445 | A1 * | 12/2011 | Byom ................ | G11C 29/883 |
| | | | | 711/170 |

(Continued)

FOREIGN PATENT DOCUMENTS

WO WO-2014028183 A1 * 2/2014 .......... G06F 11/1068

*Primary Examiner* — Matthew M Kim
*Assistant Examiner* — Indranil Chowdhury
(74) *Attorney, Agent, or Firm* — WPAT, P.C (57) ABSTRACT

A using method of a statistics table in a solid state storage device is provided. When the solid state storage device is powered on, the statistics table is loaded from a non-volatile memory into a volatile memory. A content of the statistics table contains plural ranges. The plural ranges respectively correspond to plural counting values. If an update cycle is reached, the statistics table is updated according to a sensed value. A first sum value is calculated according to the plural counting values corresponding to the plural ranges in the statistics table. The timing of enabling a data verification process for the non-volatile memory is determined according to the first sum value and a first threshold value.

18 Claims, 5 Drawing Sheets

(56) References Cited

U.S. PATENT DOCUMENTS

| | | | | |
|---|---|---|---|---|
| 2013/0212344 A1* | 8/2013 | Byom | ................... | G11C 29/42 |
| | | | | 711/159 |
| 2017/0262197 A1* | 9/2017 | Tan | ..................... | G06F 3/0679 |
| 2017/0364298 A1* | 12/2017 | Choi | ..................... | G06F 11/073 |
| 2018/0143762 A1* | 5/2018 | Kim | ....................... | G06N 3/063 |
| 2018/0314587 A1* | 11/2018 | Barber | ............... | G06F 11/1016 |
| 2020/0387327 A1* | 12/2020 | Hsieh | ................. | G06F 3/0659 |
| 2021/0073133 A1* | 3/2021 | Sharon | ............... | G06F 13/1668 |
| 2022/0269444 A1* | 8/2022 | Cariello | ................ | G06F 3/0649 |
| 2023/0074538 A1* | 3/2023 | Zhou | .................... | G06F 3/0659 |

* cited by examiner

| ~-10℃ | -10℃~0℃ | 0℃~20℃ | 20℃~40℃ | 40℃~50℃ | 50℃~60℃ | 60℃~70℃ | 70℃~80℃ | 80℃~ |
|---|---|---|---|---|---|---|---|---|
| a1 | a2 | a3 | a4 | a5 | a6 | a7 | a8 | a9 |

↖232  FIG. 3A

| ~10% | 10%~30% | 30%~60% | 60%~75% | 75%~85% | 85%~95% | 95%~ |
|---|---|---|---|---|---|---|
| b1 | b2 | b3 | b4 | b5 | b6 | b7 |

↖232  FIG. 3B

| ~8V | 8V~8.5V | 8.5V~9V | 9V~9.5V | 9.5V~10V | 10V~10.5V | 10.5V~11V | 11V~11.5V | 11.5V~12V | 12V~ |
|---|---|---|---|---|---|---|---|---|---|
| c1 | c2 | c3 | c4 | c5 | c6 | c7 | c8 | c9 | c10 |

STATISTICS TABLE OF SOLID STATE STORAGE DEVICE AND USING METHOD THEREOF

This application claims the benefit of People's Republic of China application Serial No. 202211536224.5, filed Dec. 1, 2022 and the benefit of People's Republic of China application Serial No. 202310244017.0, filed Mar. 14, 2023, the subject matter of which is incorporated herein by reference.

FIELD OF THE INVENTION

The present invention relates to a solid state storage device, and more particularly to a statistics table of a solid state storage device and a using method of the statistics table to enable a data verification process.

BACKGROUND OF THE INVENTION

As known, solid state storage devices such as SD cards or solid state drives (SSD) are widely used in various electronic devices.

Figure 1:
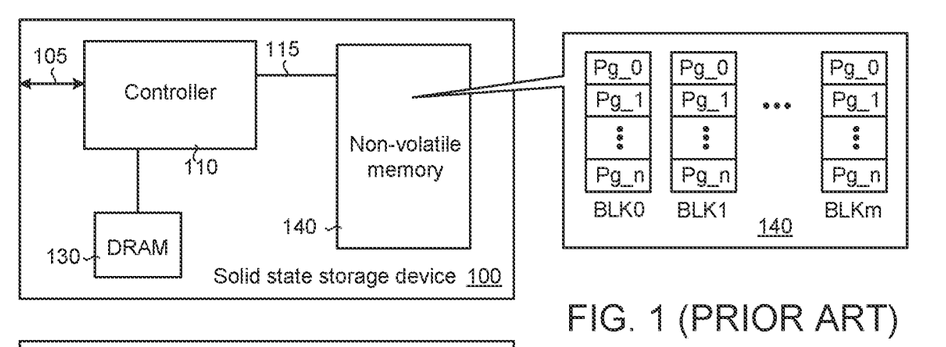
FIG. 1 (prior art) is a schematic functional block diagram illustrating the architecture of a conventional solid state storage device.

FIG. 1 is a schematic functional block diagram illustrating the architecture of a conventional solid state storage device. As shown in FIG. 1, the solid state storage device 100 comprises a controller 110, a volatile memory 130 and a non-volatile memory 140. For example, the volatile memory 130 is a dynamic random access memory (DRAM) or a static random access memory (SRAM). Hereinafter, the DRAM is taken as an example of the volatile memory 130 for illustration.

The controller 110 of the solid state storage device 100 is in communication with a host (not shown) through an external bus 105. For example, the external bus 105 is a USB bus, a SATA bus, a PCIe bus, a M.2 bus, or the like. The controller 110 is connected with the DRAM 130. In addition, the controller 110 is connected with the non-volatile memory 140 through an internal bus 115.

When the host issues a write command, a write data from the host is temporarily stored in the DRAM 130 by the controller 110 according to the write command. After the write data is subjected to an error correction (ECC) operation, the write data is stored from the DRAM 130 to the non-volatile memory 140. When the host issues a read command, the read data in the non-volatile memory 140 is temporarily stored into the DRAM 130 by the controller 110 according to the read command. After the read data is subjected to the error correction (ECC) operation, the read data is transmitted from the DRAM 130 to the host.

The non-volatile memory 140 comprises (m+1) blocks BLK0~BLKm, and each block comprises (n+1) pages Pg_0~Pg_n, wherein m and n are positive integers. For example, the non-volatile memory 140 comprises 1024 blocks. Each block comprises 64 pages. Each page is typically 16 k bytes in size. That is, the capacity of each block is 1M bytes. It is noted that the number of the blocks in the non-volatile memory 140 is not restricted to 1024. Moreover, the number of pages in each block and the size of each page can be determined by the manufacturer of the non-volatile memory 140. That is, the number of pages in each block is not restricted to 64, and the size of each page is not restricted to 16 k bytes.

Generally, as the storage time increases, the stored data in the non-volatile memory 140 of the solid state storage device 100 will be gradually lost. Moreover, the operating environment of the solid state storage device 100 may affect the accuracy of the stored data in the non-volatile memory 140. If the solid state storage device 100 is continuously operated in a poor operating environment, the probability of data loss in the non-volatile memory 140 will increase.

For example, in the poor operating environment, the number of error bits of the stored data in the non-volatile memory 140 increases. If the number of the error bits of the stored data is very small, the controller 110 can correct the error bits by performing the ECC operation. However, if the number of the error bits of the stored data is too large, the ECC operation of the controller 110 is unable to correct the error bits. Under this circumstance, the stored data will be lost.

Generally speaking, higher operating temperature and higher environmental humidity are considered as poor operating environments. In addition, the operating voltage provided by the host or a power supply is another factor affecting the operating environment. That is, the lower operating voltage and the higher operating voltage are also considered as poor operating environments. The continuous operation of the solid state storage device 100 in the poor operating environment will increase the probability of data loss in the non-volatile memory 140.

In order to maintain the accuracy of the stored data in the non-volatile memory 140, a data verification process for the solid state storage device 100 is periodically enabled at a predetermined time period.

For example, when the solid state storage device 100 is powered on, the data verification process is enabled by the controller 110. After the data verification process is enabled, the controller 110 reads all blocks of the non-volatile memory 140 with the stored data. Moreover, after the (ECC) operation is performed, the controller 110 judges the condition of the stored data according to the number of the error bits.

If the number of the error bits does not exceed a predetermined number when one page of stored data in a block is read, it means that the stored data in this page can be normally read. In other words, the stored data is stable. Whereas, if the number of the error bits exceeds the predetermined number when one page of stored data in a block is read, it means that the stored data in the page is possibly lost. In other words, the stored data is not stable. Under this circumstance, the stored data in this page will be stored into another blank page of the non-volatile memory 140 by the controller 110. Consequently, the accuracy of the stored data can be ensured, and the stored data will not be lost. Moreover, the predetermined number can be determined according to the practical requirements.

Similarly, if the controller 110 judges that the stored data in one block of the non-volatile memory 140 is possibly lost, the stored data in this block will be stored in another blank block of the non-volatile memory 140 by the controller 110. Consequently, the accuracy of the stored data can be ensured, and the stored data will not be lost.

After the accuracy of all stored data in the solid state storage device 100 has been confirmed, the data verification process is completed. Then, after the predetermined time period, the data verification process for the solid state storage device 100 will be enabled again. For example, the predetermined time period is one week, one month or one season.

However, in the predetermined time period between the completion of this data verification process and the beginning of the next data verification process, the influences of the operating environment on the stored data of the solid state storage device 100 are not taken into account. If the solid state storage device 100 is operated in the harsh environment (e.g., in the high temperature environment of a desert area or in the high humidity rainforest), the stored data in the solid state storage device 100 is more likely to be lost. That is, before the predetermined time period of the solid state storage device 100 is reached and the data verification is enabled again, the stored data in the non-volatile memory 140 is possibly already lost and irreparable. Besides, if the loss probability of the stored data in the non-volatile memory 140 is not high, the frequent data verification process on the stored data may shorten the use life of the solid state storage device 100. Therefore, it is important to control the timing of enabling the data verification process in order to achieve the good balance between the accuracy of the stored data and the use life of the solid state storage device 100.

SUMMARY OF THE INVENTION

An embodiment of the present invention provides a using method of a statistics table in a solid state storage device. The solid state storage device includes a sensor for providing a sensed value. The using method includes the following steps. Firstly, the statistics table is loaded from a non-volatile memory into a volatile memory when the solid state storage device is powered on. A content of the statistics table contains plural ranges. The plural ranges respectively correspond to plural counting values. When an update cycle is reached, the statistics table is updated according to the sensed value. Then, it is determined whether a data verification process for the non-volatile memory is enabled according to the statistics table. A first sum value is calculated according to the plural counting values corresponding to the plural ranges in the statistics table. The timing of enabling the data verification process for the non-volatile memory is determined according to the first sum value and a first threshold value.

Another embodiment of the present invention provides a using method of a statistics table in a solid state storage device. The solid state storage device includes a sensor for providing a sensed value. The using method includes the following steps. Firstly, the statistics table is loaded from a non-volatile memory into a volatile memory when the solid state storage device is powered on. A content of the statistics table contains plural ranges. The plural ranges respectively correspond to plural counting values. When an update cycle is reached, the statistics table is updated according to the sensed value. When a block close action is performed on a first block of the non-volatile memory, the statistics table is stored into the first block. Consequently, the first block becomes a first closed block. Then, the first closed block of the non-volatile memory is selected as a selected closed block. Then, an old statistics table is read from the selected closed block. Then, it is determined whether a data verification process is performed on the selected closed block according to the statistics table and the old statistics table.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

The present invention provides a statistics table of a solid state storage device and a using method of the statistics table. The solid state storage device is additionally equipped with a sensor and a statistics table. During the operation of the solid state storage device, the statistics table records the change of the operating environment of the solid state storage device. According to the content of the statistics table, the timing of enabling the solid state storage device or associated actions can be determined. For example, the timing of enabling the solid state storage device to perform a data verification process is determined according to the operating temperature, environmental humidity or the operating voltage.

Figure 2:
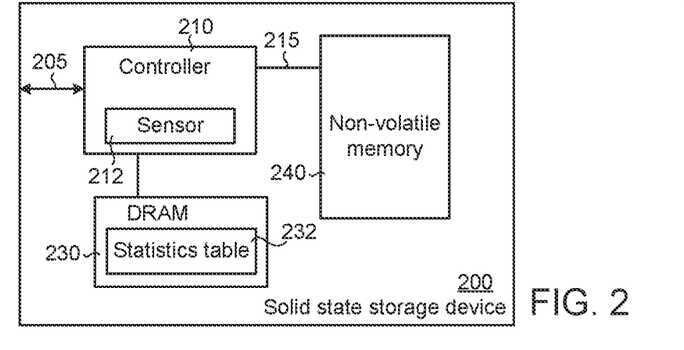
FIG. 2 is a schematic functional block diagram illustrating the architecture of a solid state storage device according to an embodiment of the present invention.

FIG. 2 is a schematic functional block diagram illustrating the architecture of a solid state storage device according to an embodiment of the present invention. As shown in FIG. 2, the solid state storage device 200 comprises a controller 210, a volatile memory 230 and a non-volatile memory 240. For example, the volatile memory 230 is a dynamic random access memory (DRAM) or a static random access memory (SRAM). Hereinafter, the DRAM is taken as an example of the volatile memory 230 for illustration. Similarly, the non-volatile memory 240 comprises plural blocks. Each block contains plural pages.

The controller 210 of the solid state storage device 200 is in communication with a host (not shown) through an external bus 205. For example, the external bus 205 is a USB bus, a SATA bus, a PCIe bus, a M.2 bus, or the like. The controller 210 is connected with the DRAM 230. In addition, the controller 210 is connected with the non-volatile memory 240 through an internal bus 215.

In an embodiment, the solid state device 200 further comprises at least one sensor 212 and a statistics table 232. The sensor 212 is used to generate a sensed value of the solid state storage device 200. The sensed value can be considered as the current operating environment of the solid state storage device 200. The statistics table 232 is used to continuously record the sensed value of the solid state storage device 200.

In an embodiment, the at least one sensor 212 is included in the controller 210. In another embodiment, the at least one sensor 212 is installed outside the controller 210 and electrically connected with the controller 210. In some other embodiments, the at least one sensor 212 is included in the DRAM 230 and/or the non-volatile memory 240. It is noted that the installation position and the number of the at least one sensor 212 are not restricted. The controller 210 receives at least one sensed signal from the at least one sensor 212. According to the average value of the at least one sensed signal, the controller 210 acquires the sensed value of the solid state storage device 200.

In this embodiment, the statistics table 232 is built in the DRAM 230. After the solid state storage device 200 leaves the factory, the sensed value of the solid state storage device 200 is continuously recorded in the statistics table 232. Moreover, before the solid state storage device 200 is powered off, the content in the statistics table 232 is stored from the DRAM 230 to the non-volatile memory 240 of the solid state storage device 200. When the solid state storage device 200 is powered on again, the content in the statistics table 232 is loaded from the non-volatile memory 240 to the DRAM 230. In other words, even if the solid state storage device 200 is powered off, the content in the statistics table 232 is not lost.

According to the embodiment of the present invention, the sensor 212 of the solid state storage device 200 can be a temperature sensor, a humidity sensor or a voltage sensor. The sensed value can be the operating temperature, the environmental humidity value or the operating voltage of the solid state storage device 200. The statistics table 232 can be the temperature statistics table, the humidity statistics table or the voltage statistics table.

Figure 3A:
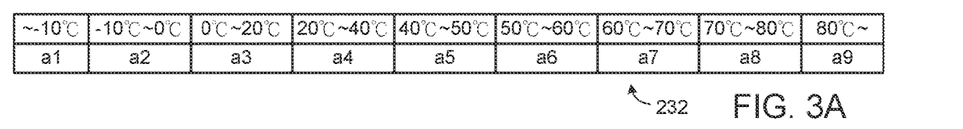
FIG. 3A illustrates a first example of a statistics table according to the operating temperature.
Figure 3B:
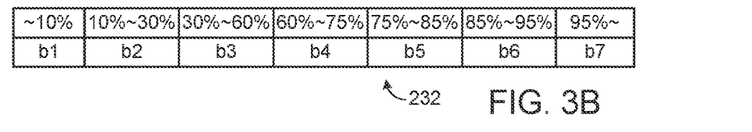
FIG. 3B illustrates a second example of a statistics table according to the environmental humidity.
Figure 3C:
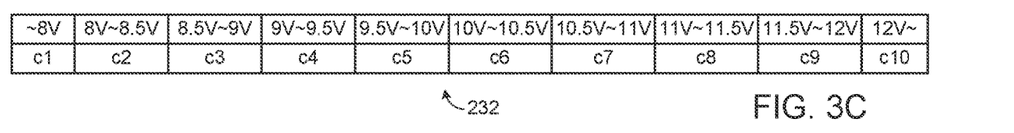
FIG. 3C illustrates a third example of a statistics table according to the operating voltage.

FIG. 3A illustrates a first example of a statistics table according to the operating temperature. FIG. 3B illustrates a second example of a statistics table according to the environment humidity. FIG. 3C illustrates a third example of a statistics table according to the operating voltage.

As shown in FIG. 3A, it is a temperature statistics table 232. The temperature statistics table 232 contains plural ranges (plural temperature ranges). In the first example, the temperature statistics table 232 comprises nine temperature ranges, including the temperature range below −10 C, the temperature range between −10 C and 0 C, the temperature range between 0 C and 20 C, the temperature range between 20 C and 40 C, the temperature range between 40 C and 50 C, the temperature range between 50 C and 60 C, the temperature range between 60 C and 70 C, the temperature range between 70 C and 80 C, and the temperature range above 80 C. Moreover, the nine temperature ranges are respectively related to nine counting values a1~a9. After the solid state storage device 200 leaves the factory and before the solid state storage device 200 starts to be used, the counting values a1~a9 are all 0. Then, the counting values a1~a9 are continuously accumulated and not cleared.

As shown in FIG. 3B, it is a humidity statistics table 232. The humidity statistics table 232 contains plural ranges (plural humidity ranges). In the second example, the humidity statistics table 232 comprises seven humidity ranges, including the humidity range below 10%, the humidity range between 10% and 30%, the humidity range between 30% and 60%, the humidity range between 60% and 75%, the humidity range between 75% and 85%, the humidity range between 85% and 95%, and the humidity range above 95%. Moreover, the seven humidity ranges are respectively related to seven counting values b1~b7. After the solid state storage device 200 leaves the factory and before the solid state storage device 200 starts to be used, the counting values b1~b7 are all 0. Then, the counting values b1~b7 are continuously accumulated and not cleared.

As shown in FIG. 3C, it is a voltage statistics table 232. The voltage statistics table 232 contains plural ranges (plural voltage ranges). In the third example, the voltage statistics table 232 comprises ten voltage ranges, including the voltage range below 8V, the voltage range between 8V and 8.5V, the voltage range between 8.5V and 9V, the voltage range between 9V and 9.5V, the voltage range between 9.5V and 10V, the voltage range between 10V and 10.5V, the voltage range between 10.5V and 11V, the voltage range between 11V and 11.5V, the voltage range between 11.5V and 12V, and the voltage range above 12V. Moreover, the ten voltage ranges are respectively related to ten counting values c1~c10. After the solid state storage device 200 leaves the factory and before the solid state storage device 200 starts to be used, the counting values c1~c10 are all 0. Then, the counting values c1~c10 are continuously accumulated and not cleared.

It is noted that the number of the ranges in the statistics table 232 is not restricted. Moreover, the upper limit value and the lower limit value in each range are not restricted, and the values of consecutive ranges are not restricted to continuous values. In other words, the number of the ranges and the upper limit value and the lower limit value in each range may be increased or decreased according to the practical requirements.

Take the temperature statistics table of FIG. 3A as an example to illustrate the usage of the statistics table. During the operation of the solid state storage device 200, the controller 210 periodically updates the content of the temperature statistics table 232 at an update cycle according to the current operating temperature of the solid state storage device 200. For example, the update cycle is 10 seconds. The controller 210 adds 1 to the counting value corresponding to the temperature range including the current operating temperature at the update cycle of 10 seconds. For example, the operating temperature sensed by the sensor 212 of the solid state storage device 200 is maintained in the range between 66 C and 67 C for one minute. Consequently, the counting value a7 corresponding to the temperature range between 60 C and 70 C is increased by 1 every 10 seconds. After one minute, the counting value a7 corresponding to the temperature range between 60 C and 70 C is increased by 6.

Similarly, take the humidity statistics table of FIG. 3B as an example, the update cycle is one hour. The controller 210 adds 1 to the counting value corresponding to the humidity range including the current humidity value at the update cycle of one hour. For example, the solid state storage device 200 continues to operate for one day, and the humidity value sensed by the sensor 212 of the solid state storage device 200 is maintained in the range between 65% and 70%. Consequently, the counting value b4 corresponding to the humidity range between 60% and 75% is increased by 1 every one hour. After one day, the counting value b4 corresponding to the humidity range between 60% and 75% is increased by 24.

The similar usage can also be applied to the voltage statistics table of FIG. 3C, and not redundantly described herein.

Figure 3D:
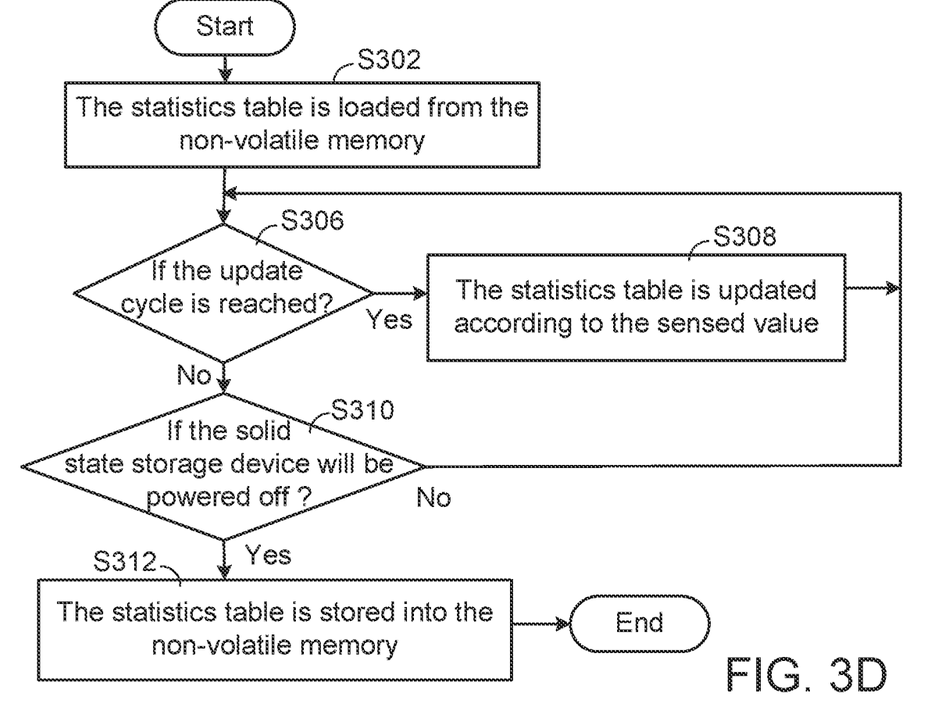
FIG. 3D is a flowchart illustrating a method for managing a statistics table according to a first embodiment of the present invention.

FIG. 3D is a flowchart illustrating a method for managing a statistics table according to a first embodiment of the present invention.

When the solid state storage device 200 is powered on, the statistics table 232 is loaded from the non-volatile memory 240 by the controller 210 (Step S302). In other words, the statistics table 232 is loaded from the non-volatile memory 240 into the DRAM 230 by the controller 210.

When the solid state storage device 200 is in the normal working state, the controller 210 continuously counts time and judges whether the update cycle is reached (Step S306). If the judging result of the step S306 indicates that the update cycle is reached, the statistics table 232 is updated by the controller 210 according to the sensed value (Step S308). For example, the statistics table 232 is a temperature statistics table 232 shown in FIG. 3A, and the update cycle is 10 seconds. In other words, when updating the statistics table 232, 1 is added to the counting value corresponding to the temperature range including the operating temperature (sensed value) by the controller 210 every 10 seconds. After the step S308, the step S306 is repeatedly done.

Whereas, if the judging result of the step S306 indicates that the update cycle is not reached, a step S310 is performed to judge whether the solid state storage device 200 will be powered off. If the judging condition of the step S310 is not satisfied, the controller 210 continuously counts time and the step S306 is repeatedly done. Whereas, if the judging condition of the step S310 is satisfied, it means that the solid state storage device 200 is about to be powered off. The statistics table 232 is stored from the DRAM 230 to the non-volatile memory 240 by the controller 210 (Step S312) before the solid state storage device 200 is powered off.

As mentioned above, when the solid state storage device 200 is powered on, the content in the statistics table 232 is loaded from the non-volatile memory 240 into the DRAM 230. When the solid state storage device 200 is in the normal working state, the controller 210 adds 1 to the counting value corresponding to the range including the current sensed value at the update cycle (e.g., 10 seconds). Before the solid state storage device 200 is powered off, the content in the statistics table 232 is stored from the DRAM 230 into the non-volatile memory 240 of the solid state storage device 200.

As mentioned above, the counting values in the statistics table 232 are continuously accumulated and not cleared. Consequently, the content in the statistics table 232 (i.e., the counting values in the statistics table 232) can be used to expand the applications of the solid state storage device 200. For example, the statistics table 232 can be applied to the data verification process for the solid state storage device 200.

Generally, the operating environment with the relative higher temperature or the relative lower temperature is more harmful to the stored data. For reducing the influence of the high operating temperature and the low operating temperature on the stored data, different temperature ranges in the temperature statistics table 232 are assigned with different weights by the controller 210. For example, the controller 210 assigns corresponding weights Wa1~Wa9 to the nine temperature ranges in the temperature statistics table 232. Especially, the temperature range including the high operating temperature or the low operating temperature is assigned with a larger weight.

For example, the weight Wa1 corresponding to the temperature range below −10 C is 2.0, the weight Wa2 corresponding to the temperature range between −10 C and 0 C is 1.5, the weight Wa3 corresponding to the temperature range between 0 C and 20 C is 1, the weight Wa4 corresponding to the temperature range between 20 C and 40 C is 1.1, the weight Wa5 corresponding to the temperature range between 40 C and 50 C is 1.3, the weight Wa6 corresponding to the temperature range between 50 C and 60 C is 1.5, the weight Wa7 corresponding to the temperature range between 60 C and 70 C is 1.8, the weight Wa8 corresponding to the temperature range between 70 C and 80 C is 2.0, and the weight Wa9 corresponding to the temperature range above 80 C is 2.2.

According to the weights and counting values, the controller 210 performs the following calculation. Firstly, the counting values a1~a9 corresponding to the nine temperature ranges are respectively multiplied by the weights Wa1~Wa9, and thus nine multiplication results are obtained. Then, the nine multiplication results are added, and thus a first sum value SUM1 is obtained. That is, the first sum value SUM1 for the temperature statistics table may be expressed as the following formula:

Then, the controller 210 determines the timing of enabling the data verification process according to the first sum value SUM1 and a first threshold value TH1.

Similarly, the high environmental humidity, the high operating voltage or the low operating voltage is harmful to the stored data. For humidity statistics table shown in FIG. 3B, the controller 210 assigns weights Wb1~Wb7 for the corresponding counting values b1~b7. The humidity range including the higher humidity is assigned with a larger weight. The first sum value SUM1 for the humidity statistics table may be expressed as.

For voltage statistics table shown in FIG. 3C, the controller 210 assigns weights Wc1~Wc10 for the corresponding counting values c1~c10. The voltage range including the high operating voltage or the low operating voltage is assigned with a larger weight. The first sum value SUM1 for the voltage statistics table may be expressed as $SUM1=\Sum_{i=1}^{10}(c_i \times Wc_i)$.

Figure 3E:
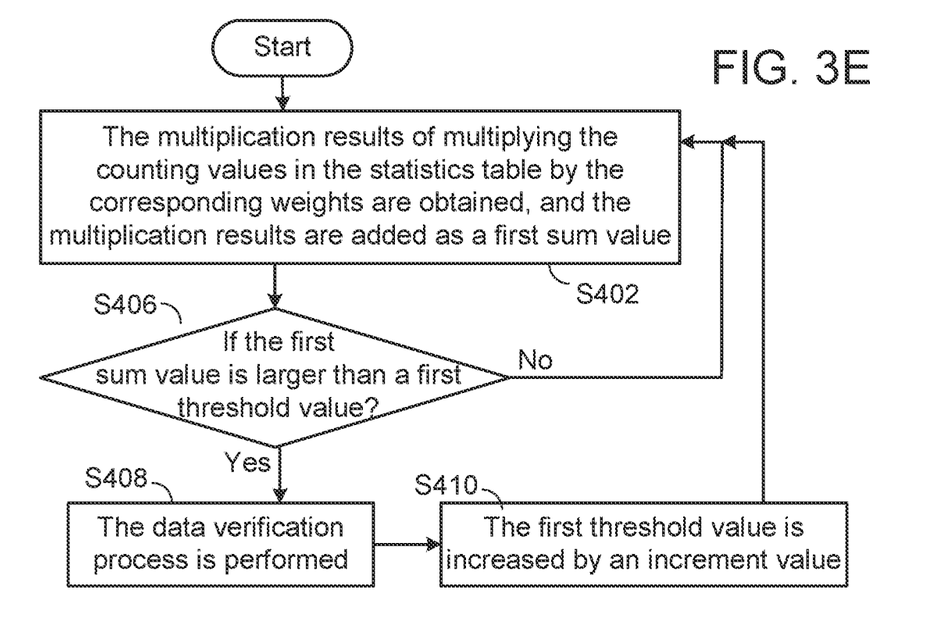
FIG. 3E is a flowchart illustrating a method of determining the timing of enabling a data verification process by using the managing method according to the first embodiment of the present invention.

FIG. 3E is a flowchart illustrating a method of determining the timing of enabling a data verification process by using the managing method according to the first embodiment of the present invention.

Take the temperature statistics table of FIG. 3A as an example to illustrate the managing method. When the solid state storage device 200 is in the normal working state, the multiplication results of multiplying the counting values a1~a9 in the temperature statistics table 232 by the corresponding weights Wa1~Wa9 are obtained, and the multiplication results are added as a first sum value SUM1 (step S402). Then, a step S406 is performed to judge whether the first sum value SUM1 is larger than a first threshold value TH1.

As mentioned above, the counting values a1~a9 in the temperature statistics table 232 are updated by the controller 210 at the update cycle. Consequently, the first sum value SUM1 is continuously updated. In an embodiment, the controller 210 calculates the updated first sum value SUM1 immediately after the update cycle. In another embodiment, the controller 210 calculates the updated first sum value SUM1 after plural update cycles (e.g., three update cycles). If the judging result of the step S406 indicates that the first sum value SUM1 is not larger than the first threshold value TH1, the data verification process is not enabled. Then, the step S402 is repeatedly performed, and a new first sum value SUM1 is calculated.

Whereas, if the judging result of the step S406 indicates that the first sum value SUM1 is larger than the first threshold value TH1, the controller 210 performs the data verification process (Step S408). After the data verification process is completed, the first threshold value TH1 is increased by an increment value TH (Step S410). Then, the step S402 is repeatedly done.

The data verification process is similar to that of the conventional technology. After the data verification process is enabled, the controller 210 reads all blocks of the non-volatile memory 240 with the stored data. Moreover, after the (ECC) operation is performed, the controller 210 judges the stability condition of the stored data according to the number of the error bits. If the controller 210 judges that one page of stored data is not stable and possibly lost, the stored data in this page will be stored into another blank page of the non-volatile memory 240 by the controller 210. Consequently, the accuracy of the stored data can be ensured. Similarly, if the controller 210 judges that the stored data in one block of the non-volatile memory 240 is possibly lost, the stored data in this block will be stored in another blank block of the non-volatile memory 240 by the controller 210. Consequently, the accuracy of the stored data can be ensured, and the stored data will not be lost.

In an embodiment, the initial value of the first threshold value TH1 and the increment value TH of the first threshold value are previously set before the solid state storage device 200 leaves the factory. For example, the initial value of the first threshold value TH1 is set as 10000, and the increment value TH of the first threshold value is set as 10000. When the solid state storage device 200 is in the normal working state, the counting values a1~a9 in the temperature statistics table 232 are updated by the controller 210 at the update cycle. In other words, the first sum value SUM1 is continuously increased. If the first sum value SUM1 is larger than the first threshold value TH1 (e.g., 10000), the controller 210 enables the data verification process. After the data verification process is completed, the first threshold TH1 is changed to 20000. That is, TH1+TH=10000+10000=20000. Consequently, in the subsequent operation of the solid state storage device 200, if the first sum value SUM1 is larger than the first threshold value TH1 (e.g., 20000), the data verification process is enabled again by the controller 210. The rest may be deduced by analogy. It is noted that the weights Wa1~Wa9, the first threshold value TH1 and the increment value TH of the first threshold value are not restricted. That is, these values may be varied according to the practical requirements.

As mentioned above, if the solid state storage device 200 is operated in the harsh environment (e.g., in the operating environment with the relative higher temperature, the relative lower temperature, higher humidity, higher operating voltage, or lower operating voltage), the first sum value Sum1 is increased quickly. In order to maintain the accuracy of the stored data, the data verification process for the solid state storage device 200 is enabled at a shortened period. On the other hand, if the solid state storage device 200 is operated in the normal environment (i.e., the environment with the normal operating temperature, normal humidity, or normal operating voltage), the first sum value Sum1 is increased slowly. Under this circumstance, the data verification process for the solid state storage device 200 is enabled at an extended period. Consequently, the use life of the solid state storage device 200 will be extended. In other words, the timing of enabling the data verification process for the solid state storage device 200 can be dynamically determined according to the content in the statistics table 232. In this way, the good balance between the accuracy of the stored data and the use life of the solid state storage device 200 can be achieved.

As mentioned above, after the data verification process is enabled, the controller 210 reads all blocks of the non-volatile memory 240 with the stored data and judges the stability condition of the stored data. However, after the solid state storage device 200 has been used for a certain time period, the number of blocks with the stored data is increased to a large number. Consequently, it takes a longer time to perform the data verification process. For solving these drawbacks, the method of managing the statistics table and the method of determining the timing of enabling the data verification process by using the managing method need to be further modified. The modified methods will be described as follows.

Generally, when the solid state storage device 200 is in the normal working state, the solid state storage device 200 can receive the write command from the host and store the write data into an open block of the non-volatile memory 240. If the open block is about to be filled with the write data, the controller 210 will perform a block close action on the open block. When the block close action is performed, a closed data is written into a page of the open block by the controller 210. Consequently, the open block becomes a closed block, and no data is able to be written into the closed block. For example, the closed data is written into the last page of the block, and the closed data at least contains the mapped data about all physical allocation addresses (PAA) and the corresponding logical allocation addresses (LAA) in the block.

After the block close action is completed, another blank block in the non-volatile memory 240 will be set as the open block by the controller 210. In addition, the received write data will be stored into the open block. Similarly, if the open block is about to be filled with the write data, the controller 210 will perform a block close action on the open block.

In the second embodiment of the present invention, the content in the current statistics table 232 is used as a part of the closed data by the controller 210 when the block close action is performed. In other words, the content in the current statistics table 232 is also stored in the closed block.

Figure 4A:
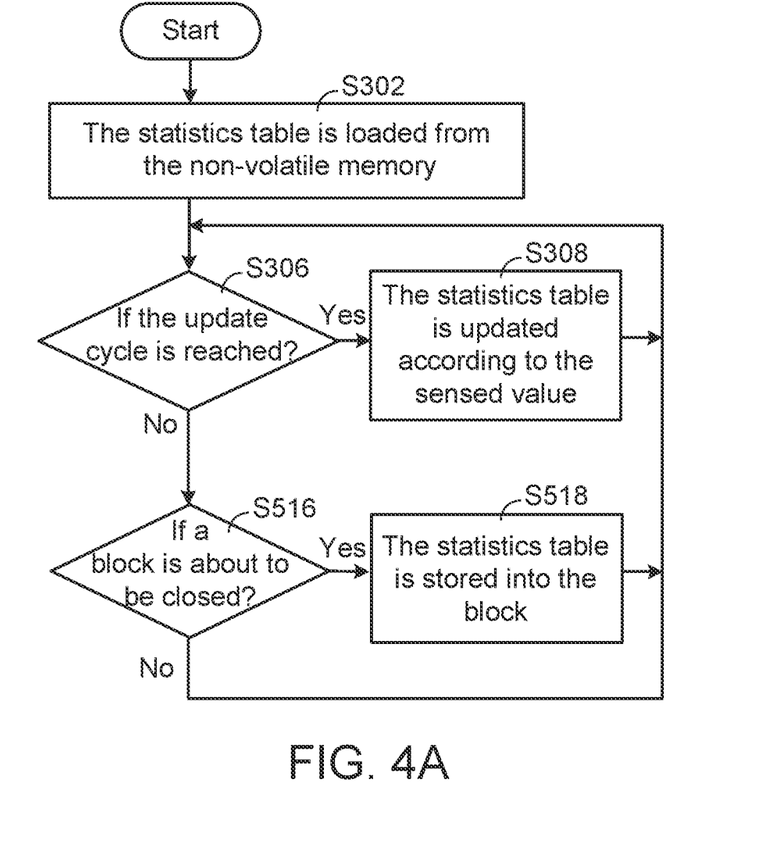
FIG. 4A is a flowchart illustrating a method for managing a statistics table according to a second embodiment of the present invention.

FIG. 4A is a flowchart illustrating a method for managing a statistics table according to a second embodiment of the present invention.

When the solid state storage device 200 is powered on, the statistics table 232 is loaded from the non-volatile memory 240 by the controller 210 (Step S302). When the solid state storage device 200 is in the normal working state, the controller 210 continuously counts time and judges whether the update cycle is reached (Step S306).

If the judging result of the step S306 indicates that the update cycle is reached, the statistics table 232 is updated by the controller 210 according to the sensed value (Step S308). Take the temperature statistics table of FIG. 3A as an example, the update cycle is 10 seconds. In other words, when updating the statistics table 232, 1 is added to the counting value corresponding to the temperature range including the operating temperature (sensed value) by the controller 210 every 10 seconds. After the step S308, the step S306 is repeatedly done.

Whereas, if the judging result of the step S306 indicates that the update cycle is not reached when the solid state storage device 200 is in the normal working state, a step S516 is performed to judge whether an open block is about to be closed by the controller 210. If the judging condition of the step S516 is satisfied, the statistics table 232 is stored into the open block to be closed (Step S518). That is, when a block close action is about to be performed on an open block in the non-volatile memory 240, the content in the current statistics table 232 is used as a part of the closed data by the controller 210 and stored into the open block. Then, the open block is set as a closed block. Moreover, if the judging result of the step S306 indicates that the update cycle is not reached and the judging condition of the step S516 is not satisfied, the controller 210 continuously counts time and the step S306 is repeatedly done.

Like the managing method of the first embodiment, if the solid state storage device 200 is about to be powered off, the statistics table 232 will be stored from the DRAM 230 to the non-volatile memory 240 by the controller 210. Then, the solid state storage device 200 is powered off.

As mentioned above, when the solid state storage device 200 is powered on, the content in the statistics table 232 is loaded from the non-volatile memory 240 into the DRAM 230. When the solid state storage device 200 is in the normal working state, the controller 210 adds 1 to the counting value corresponding to the range including the current sensed value at the update cycle. Moreover, if an open block is about to be closed when the solid state storage device 200 is in the normal working state, the content in the current statistics table 232 is used as a part of the closed data by the controller 210 and stored into the closed block. Similarly, before the solid state storage device 200 is powered off, the content in the statistics table 232 is stored from the DRAM 230 into the non-volatile memory 240 of the solid state storage device 200.

Figure 4B:
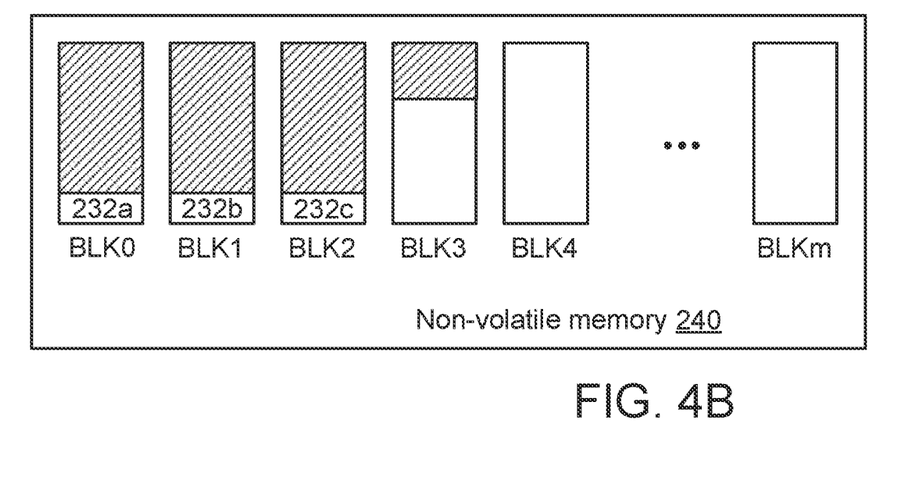
FIG. 4B schematically illustrates the operations of the non-volatile memory in the solid state storage device when the managing method of FIG. 4A is performed.

FIG. 4B schematically illustrates the operations of the non-volatile memory in the solid state storage device when the managing method of FIG. 4A is performed.

As shown in FIG. 4B, the non-volatile memory 240 of the solid state storage device 200 comprises m blocks BLK0~BLKm. The blocks BLK0~BLK2 are the closed blocks, which are unable to store new write data. The blocks BLK3 is the opened block, which is able to store the new write data. The other blocks BLK4~BLKm are blank blocks.

Take the temperature statistics table of FIG. 3A as an example, when the block close action is performed on the block BLK0, the content in the current temperature statistics table 232a is used as a part of the closed data by the controller 210 and stored into the block BLK0. Similarly, when the block close action is performed on the block BLK1, the content in the current temperature statistics table 232b is used as a part of the closed data by the controller 210 and stored into the block BLK1. Similarly, when the block close action is performed on the block BLK2, the content in the current temperature statistics table 232c is used as a part of the closed data by the controller 210 and stored into the block BLK2.

In other words, the contents in the temperature statistics tables 232a, 232b and 232c of the closed blocks BLK0~BLK2 indicate the previous operating temperature information of the solid state storage device 200. Moreover, the closed blocks BLK0~BLK2 of the non-volatile memory 240 store the temperature statistics table 232a, 232b and 232c, respectively. Consequently, according to the current temperature statistics table 232 and the old temperature statistics tables 232a, 232b and 232c in the closed blocks BLK0~BLK2, the controller 210 determines whether the respective closed blocks need to be subjected to the data verification process. Consequently, the time period of performing the data verification process is largely reduced.

For example, the old temperature statistics table 232a in the closed block BLK0 stores the counting values ao1~ao7 corresponding to the nine temperature ranges, and the current temperature statistics table 232 stores the counting values a1~a9. According to the difference between the new temperature statistics table and the old temperature statistics table (i.e., the differences between the counting values corresponding to the nine temperature ranges), the controller 210 determines whether the data verification process needs to be performed on the closed block BLK0.

Similarly, different temperature ranges in the temperature statistics table 232 are assigned with different weights by the controller 210. For example, the controller 210 assigns corresponding weights Wa1~Wa9 to the nine temperature ranges in the temperature statistics table 232. Especially, the temperature range including the high operating temperature or the low operating temperature is assigned with a larger weight. For example, the weight Wa1 corresponding to the temperature range below −10 C is 2.0, the weight Wa2 corresponding to the temperature range between −10 C and 0 C is 1.5, the weight Wa3 corresponding to the temperature range between 0 C and 20C is 1, the weight Wa4 corresponding to the temperature range between 20 C and 40 C is 1.1, the weight Wa5 corresponding to the temperature range between 40 C and 50 C is 1.3, the weight Wa6 corresponding to the temperature range between 50 C and 60 C is 1.5, the weight Wa7 corresponding to the temperature range between 60 C and 70 C is 1.8, the weight Wa8 corresponding to the temperature range between 70 C and 80 C is 2.0, and the weight Wa9 corresponding to the temperature range above 80 C is 2.2. It is noted that the values of the weights w1~w9 are not restricted. That is, the values of the weights Wa1~Wa9 may be varied according to the practical requirements.

According to the weights and counting values, the controller 210 performs the following calculation.

Firstly, the difference values between the counting values a1~a9 in the current temperature statistics table 232 and the counting values ao1~ao9 in the old temperature statistics table 232a of the closed block BLK0 are respectively multiplied by the weights Wa1~Wa9, and thus nine multiplication results are obtained. Then, the nine multiplication results are added, and thus a second sum value SUM2 is obtained. That is, the second sum value SUM2 may be expressed as the following formula:

Then, according to the second sum value SUM2 and the second threshold value TH2, the controller 210 determines whether the data verification process needs to be performed on the closed block BLK0.

Similarly, the second sum value SUM2 for the closed block BLK1 is obtained according to the difference values between the counting values a1~a9 in the current temperature statistics table 232 and the counting values ao1~ao9 in the old temperature statistics table 232b of the closed block BLK1. According to the second sum value SUM2 and the second threshold value TH2, the controller 210 determines whether the data verification process needs to be performed on the closed block BLK1. Similarly, the second sum value SUM2 for the closed block BLK2 is obtained according to the difference values between the counting values a1~a9 in the current temperature statistics table 232 and the counting values ao1~ao9 in the old temperature statistics table 232c of the closed block BLK2. According to the second sum value SUM2 and the second threshold value TH2, the controller 210 determines whether the data verification process needs to be performed on the closed block BLK2.

In other words, the controller 210 calculates the second sum value SUM2 of a specified closed block, and the controller 210 determines whether the data verification process needs to be performed on the specified closed block according to the second sum value SUM2.

Similarly, for humidity statistics table shown in FIG. 3B, the controller 210 assigns weights Wb1~Wb7. The second sum value SUM2 for the current humidity statistics table and the old humidity statistics table may be expressed as. The parameter boi means the count value in the old humidity statistics table.

For voltage statistics table shown in FIG. 3C, the controller 210 assigns weights Wc1~Wc10. The second sum value SUM2 for the current voltage statistics table and the old voltage statistics table may be expressed as. The parameter coi means the count value in the old voltage statistics table.

Figure 4C:
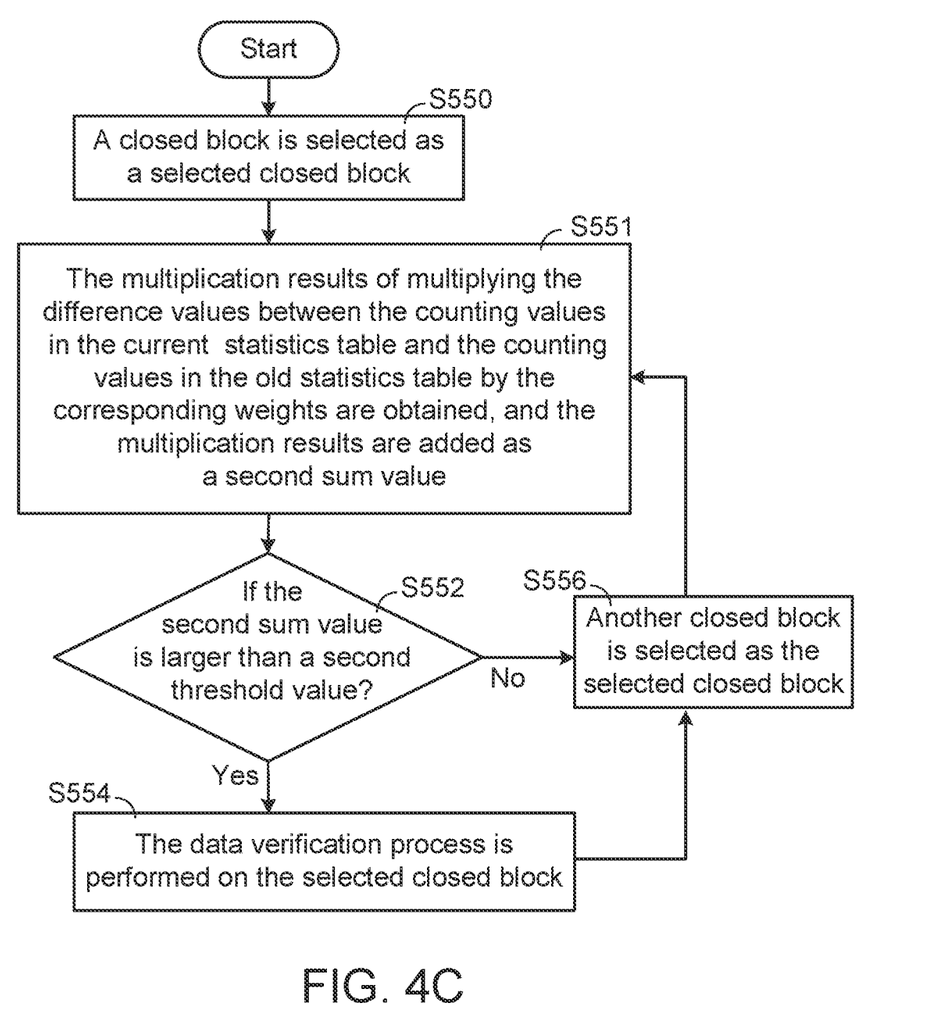
FIG. 4C is a flowchart illustrating a method of determining the timing of enabling a data verification process by using the managing method according to the second embodiment of the present invention.

FIG. 4C is a flowchart illustrating a method of determining the timing of enabling a data verification process by using the managing method according to the second embodiment of the present invention. Firstly, a closed block is selected as a selected closed block (step S550). Then, the controller 210 reads the current statistics table and the old statistics table in the selected closed block. The multiplication results of multiplying the difference values between the counting values in the current statistics table and the counting values in the old statistics table by the corresponding weights are obtained, and the multiplication results are added as a second sum value SUM2 (step S551).

Take the temperature statistics table of FIG. 3A as an example, the selected closed block BLK0 is the selected closed block. The controller 210 reads the counting values a1~a9 in current temperature statistics table 232 and the counting values ao1~ao9 in the old temperature statistics table 232a of the selected closed block BLK0. Then, the difference values between the counting values a1~a9 and the counting values ao1~ao9 are respectively multiplied by the weights w1~w9, and thus nine multiplication results are obtained. Then, the nine multiplication results are added, and thus the second sum value SUM2 is obtained. That is, the second sum value SUM2 may be expressed as the following formula:

Then, a step S552 is performed to judge whether the second sum value SUM2 is larger than a second threshold value TH2. If the judging condition of the step S552 is not satisfied, the data verification process will not be performed on the selected closed block by the controller 210. After another closed block is selected as the selected closed block (step S556), the step S551 is repeatedly done.

Whereas, if the judging condition of the step S552 is satisfied, the data verification process is performed on the selected closed block by the controller 210 (Step S554). After the data verification process is completed, another closed block is selected as the selected closed block (step S556), and the step S551 is repeatedly done.

For example, the second threshold value TH2 is set as 100. If the second sum value SUM2 of the selected closed block is larger than the second threshold value TH2 (i.e., SUM2>100), the controller 210 performs the data verification process on the selected closed block. It is noted that the second threshold value TH2 is not restricted. That is, the second threshold value TH2 may be varied according to the practical requirements.

In an embodiment, while the data verification process is performed on the selected closed block, the controller 210 reads the data from the selected closed block and recognizes the data stability of the selected closed block. If the data in the selected closed block is possibly lost, the data in the selected closed block will be stored into a blank block by the controller 210. In another embodiment, while the data verification process is performed on the selected closed block, the controller 210 reads the data from one page of the selected closed block and recognizes the data stability of the page of the selected closed block. If the data in the page of the selected closed block is possibly lost, the data in the page of the selected closed block will be stored into a blank page by the controller 210.

In some other embodiments, the controller 210 determines whether the data verification process for the solid state storage device 200 needs to be enabled according to the flowchart of FIG. 3E. If the controller 210 decides to enable the data verification process for the solid state storage device 200, the controller 210 performs the flowchart of FIG. 4C to determine whether the individual closed block needs to be subjected to the data verification process.

As mentioned above, the controller 210 judges whether the data verification process is performed on the closed blocks according to the difference between the current statistics table and the old statistics table. If the selected closed block does not need to be subjected to the data verification process or the data verification process is completed, the controller 210 may select other another closed state and perform the above procedures again.

In the embodiment of FIG. 4A, the technical concept of recording the statistics table 232 in the closed block can provide other applications. For example, this technical concept can be utilized by the researchers and developers of the solid state storage device 200. The reasons will be described as follows.

In case that the solid state storage device 200 has a breakdown and returns to the factory for inspection, the researchers and developers can precisely analyze the solid state storage device 200 according to the counting values in the statistics tables 232a, 232b and 232c of the closed blocks BLK0, BLK1 and BLK2.

For example, the researchers and developers may read the statistics tables 232a and 232b from the closed blocks BLK0 and BLK1. According to the difference between the content in the statistics table 232a and the content in the statistics table 232b, the researchers and developers can speculate the operating environment of the solid state storage device 200 in the time period between time point of processing the closed block BLK0 and the time point of processing the closed block BLK1. Furthermore, at the end of life (EOL) of the solid state storage device 200, the researchers and developers may collect the contents in the statistics tables 232a, 232b and 232c of the closed blocks BLK0, BLK1 and BLK2 as a big data. The parameters or other operating parameters of the solid state storage devices that will be fabricated in the future may be adjusted and set according to the big data. For example, the operating parameters include the first threshold value TH1, the increment value TH and the second threshold value TH2. Consequently, the operating efficiency of the solid state storage device is enhanced, and the use life of the solid state storage device is effectively extended.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A using method of a statistics table in a solid state storage device, the solid state storage device comprising a sensor for providing a sensed value, the using method comprising steps of:
   loading the statistics table from a non-volatile memory into a volatile memory when the solid state storage device is powered on, wherein a content of the statistics table contains plural ranges, and the plural ranges respectively correspond to plural counting values;
   judging whether an update cycle is reached;
   when the update cycle is reached, updating the statistics table according to the sensed value; and
   determining whether a data verification process for the non-volatile memory is enabled according to the statistics table, wherein a first sum value is calculated according to the plural counting values corresponding to the plural ranges in the statistics table, and a timing of enabling the data verification process for the non-volatile memory is determined according to the first sum value and a first threshold value.

2. The using method as claimed in claim 1, wherein when the statistics table is updated, a first counting value corresponding to a first range of the plural ranges is added by 1, wherein the sensed value is included in the first range of the plural ranges.

3. The using method as claimed in claim 1, wherein the sensor is a temperature sensor, the sensed value is an operating temperature, and the statistics table is a temperature statistics table; the sensor is a humidity sensor, the sensed value is a humidity value, and the statistics table is a humidity statistics table; or, the sensor is a voltage sensor, the sensed value is an operating voltage, and the statistics table is a voltage statistics table.

4. The using method as claimed in claim 1, wherein the plural ranges respectively correspond to plural weights, and the using method further comprises steps of:
   allowing the plural counting values corresponding to the plural ranges in the statistics table to be multiplied by the corresponding weights, so that plural multiplication results are obtained;
   adding the plural multiplication results, thereby obtaining the first sum value;
   judging whether the first sum value is larger than the first threshold value; and
   if the first sum value is larger than the first threshold value, enabling the data verification process for the non-volatile memory.

5. The using method as claimed in claim 4, further comprising a step of increasing the first threshold value by an increment value after the data verification process is completed.

6. The using method as claimed in claim 1, wherein if the data verification process for the non-volatile memory is enabled according to the statistics table, the using method further comprises a step of reading plural blocks of the non-volatile memory with stored data and recognizing a stability condition of the stored data in the plural blocks, wherein if the stored data in a first block of the plural blocks has a low stability, the stored data in the first block is stored into a second block.

7. The using method as claimed in claim 1, wherein when a block close action is performed on a third block of the non-volatile memory, the using method further comprises a step of storing the statistics table into the third block.

8. The using method as claimed in claim 7, wherein when the data verification process for the non-volatile memory is enabled according to the statistics table, the using method further comprises steps of:
   selecting a first closed block of the non-volatile memory as a selected closed block;
   reading an old statistics table from the selected closed block; and
   determining whether the data verification process for the non-volatile memory needs to be performed on the selected closed block according to the statistics table and the old statistics table.

9. The using method as claimed in claim 8, further comprising steps of:
   calculating a second sum value according to the plural counting values corresponding to the plural ranges in the statistics table and the plural counting values corresponding to the plural ranges in the old statistics table; and
   determining whether the data verification process needs to be performed on the selected closed block according to the second sum value and a second threshold value.

10. The using method as claimed in claim 8, wherein the plural ranges respectively correspond to plural weights, and the using method further comprises steps of:
    allowing plural difference values between the plural counting values corresponding to the plural ranges in the statistics table and the plural counting values corresponding to the plural ranges in the old statistics table to be multiplied by the corresponding weights, so that plural multiplication results are obtained;
    adding the plural multiplication results, thereby obtaining a second sum value;
    judging whether the second sum value is larger than a second threshold value; and
    if the second sum value is larger than the second threshold value, performing the data verification process on the selected closed block.

11. A using method of a statistics table in a solid state storage device, the solid state storage device comprising a sensor for providing a sensed value, the using method comprising steps of:
    loading the statistics table from a non-volatile memory into a volatile memory when the solid state storage device is powered on, wherein a content of the statistics table contains plural ranges, and the plural ranges respectively correspond to plural counting values;
    judging whether an update cycle is reached;
    when the update cycle is reached, updating the statistics table according to the sensed value;
    when a block close action is performed on a first block of the non-volatile memory, storing the statistics table into the first block before the first block becomes a first closed block;
    selecting the first closed block of the non-volatile memory as a selected closed block;
    reading an old statistics table from the selected closed block; and
    determining whether a data verification process needs to be performed on the selected closed block according to the statistics table and the old statistics table.

12. The using method as claimed in claim 11, wherein when the statistics table is updated, a first counting value corresponding to a first range of the plural ranges is added by 1, wherein the sensed value is included in the first range of the plural ranges.

13. The using method as claimed in claim 11, wherein the sensor is a temperature sensor, the sensed value is an operating temperature, and the statistics table is a temperature statistics table; the sensor is a humidity sensor, the sensed value is a humidity value, and the statistics table is a humidity statistics table; or, the sensor is a voltage sensor, the sensed value is an operating voltage, and the statistics table is a voltage statistics table.

14. The using method as claimed in claim 11, further comprising steps of:
   calculating a second sum value according to the plural counting values corresponding to the plural ranges in the statistics table and the plural counting values corresponding to the plural ranges in the old statistics table; and
   determining whether the data verification process needs to be performed on the selected closed block according to the second sum value and a second threshold value.

15. The using method as claimed in claim 11, wherein the plural ranges respectively correspond to plural weights, and the using method further comprises steps of:
   allowing plural difference values between the plural counting values corresponding to the plural ranges in the statistics table and the plural counting values corresponding to the plural ranges in the old statistics table to be multiplied by the corresponding weights, so that plural multiplication results are obtained;
   adding the plural multiplication results, thereby obtaining a second sum value;
   judging whether the second sum value is larger than a second threshold value; and
   if the second sum value is larger than the second threshold value, performing the data verification process on the selected closed block.

16. The using method as claimed in claim 11, further comprising a step of calculating a first sum value according to the plural counting values corresponding to the plural ranges in the statistics table, and a timing of enabling the data verification process for the non-volatile memory is determined according to the first sum value and a first threshold value.

17. The using method as claimed in claim 11, wherein the plural ranges respectively correspond to plural weights, and the using method further comprises steps of:
   allowing the plural counting values corresponding to the plural ranges in the statistics table to be multiplied by the corresponding weights, so that plural multiplication results are obtained;
   adding the plural multiplication results, thereby obtaining a first sum value;
   judging whether the first sum value is larger than a first threshold value; and
   if the first sum value is larger than the first threshold value, enabling the data verification process for the non-volatile memory.

18. The using method as claimed in claim 17, further comprising a step of increasing the first threshold value by an increment value after the data verification process is completed.

* * * * *